(12) United States Patent
Mentzendorff

(10) Patent No.: US 10,549,730 B2
(45) Date of Patent: Feb. 4, 2020

(54) ELECTRONIC BRAKE SYSTEM FOR A TRAILER

(71) Applicant: WABCO GmbH, Hannover (DE)

(72) Inventor: Olaf Mentzendorff, Gehrden (DE)

(73) Assignee: WABCO GmbH, Hannover (DE)

( * ) Notice: Subject to any disclaimer, the term of this patent is extended or adjusted under 35 U.S.C. 154(b) by 39 days.

(21) Appl. No.: 15/916,978

(22) Filed: Mar. 9, 2018

(65) Prior Publication Data

US 2018/0257616 A1    Sep. 13, 2018

(30) Foreign Application Priority Data

Mar. 11, 2017   (DE) ........................ 10 2017 002 391

(51) Int. Cl.
*B60T 7/16* (2006.01)
*B60T 13/66* (2006.01)
(Continued)

(52) U.S. Cl.
CPC ................ *B60T 7/16* (2013.01); *B60L 15/32* (2013.01); *B60T 13/662* (2013.01);
(Continued)

(58) Field of Classification Search
CPC ........ B60T 7/16; B60T 13/662; B60T 13/665; B60T 7/20; B60T 8/00; B60T 8/323;
(Continued)

(56) References Cited

U.S. PATENT DOCUMENTS 5,677,667 A * 10/1997 Lesesky ................... B60D 1/62
340/431
6,501,376 B2 * 12/2002 Dieckmann .............. B60D 1/62
303/122.02
(Continued)

FOREIGN PATENT DOCUMENTS

DE    102013217684 A1    3/2015
DE    102014004182 A1    9/2015
(Continued)

OTHER PUBLICATIONS

Machine assisted translation of DE102013217684A1 obtained from https://patents.google.com on Jul. 1, 2019, 5 pages.
(Continued)

*Primary Examiner* — Pamela Rodriguez
(74) *Attorney, Agent, or Firm* — Warner Norcross + Judd LLP

(57) ABSTRACT

An electronic brake system for a trailer with a pneumatic brake installation is disclosed. The electronic brake system comprises a brake controller (18) in the trailer (11) connected to a first communication device (20) that is part of a first communication channel (23) for wirelessly receiving brake signals of a towing vehicle (10). The electronic brake system also comprises a second communication channel for receiving brake signals of the towing vehicle. The brake controller (18) converts the brake signals of the first communication channel (23) into brake commands for the pneumatic brake installation only if brake signals arrive via the second communication channel (24) at the same time or
(Continued)

within a defined time window. The time window begins as soon as a brake signal arrives on one of the first and second communication channels (23, 24).

19 Claims, 2 Drawing Sheets

(51) Int. Cl.
    *G07C 5/00*             (2006.01)
    *B60L 15/32*           (2006.01)
    *B60D 1/62*            (2006.01)

(52) U.S. Cl.
    CPC ............ *B60T 13/665* (2013.01); *G07C 5/008* (2013.01); *B60D 1/62* (2013.01)

(58) Field of Classification Search
    CPC ........ B60T 8/17; B60T 8/1708; B60T 13/263; B60T 13/265; B60T 13/36; B60T 13/683; B60L 15/32; G07C 5/008; B60D 1/62
    See application file for complete search history.

(56) References Cited

U.S. PATENT DOCUMENTS

| | | | |
|---|---|---|---|
| 7,142,098 B2* | 11/2006 | Lang | B60D 1/62 |
| | | | 340/431 |
| 10,149,348 B2* | 12/2018 | Dieckmann | G08C 17/00 |
| 10,160,427 B2* | 12/2018 | Risse | H04W 76/10 |
| 2002/0030590 A1 | 3/2002 | Dieckmann et al. | |
| 2017/0088104 A1* | 3/2017 | Risse | H04W 76/10 |

FOREIGN PATENT DOCUMENTS

| | | |
|---|---|---|
| DE | 102014015394 A1 | 4/2016 |
| DE | 102016010644 A1 | 3/2018 |
| EP | 1186510 A1 | 3/2002 |

OTHER PUBLICATIONS

Machine assisted translation of DE102016010644A1 obtained from https://patents.google.com on Jul. 1, 2019, 5 pages.

* cited by examiner

ELECTRONIC BRAKE SYSTEM FOR A TRAILER

CROSS-REFERENCE TO RELATED APPLICATIONS

This application claims priority to and all advantages of German Patent Application No. 10 2017 002 391.3, filed on 11 Mar. 2017, the content of which is hereby incorporated by reference.

FIELD OF THE INVENTION

The invention generally relates to an electronic brake system and, more specifically to an electronic brake system for a trailer with a pneumatic brake installation. In addition, the invention relates to a brake controller and a method for operating the electronic brake system.

BACKGROUND OF THE INVENTION

Modern commercial vehicles with a pneumatic brake installation have an electronic brake system that actuates an electropneumatic control unit (modulator), which shortens the reaction time for braking and furthermore provides further functions, such as antilock control, antiskid control, etc. The electronic brake system typically also includes a brake controller that controls the operation of the modulator. The modulator and the brake controller are typically combined in one unit.

Trailers with a pneumatic brake installation likewise have an electronic brake system with a brake controller and a trailer modulator. Towing vehicles and trailers can be connected to one another via two pneumatic lines (supply pressure and brake pressure) and an electrical line.

In Europe, the electrical line contains a standardized data connection between the brake controller of the towing vehicle and the brake controller of the trailer. The data connection is used to transmit brake signals from the towing vehicle to the electronic brake system of the trailer without delay.

In North America, trailers obtain brake signals only via the pneumatic line carrying the control pressure. As a result, the time before the brakes in the trailer respond is much longer than in trailers in Europe. A wireless connection of towing vehicle and trailer is disclosed in EP 1 186 510 A1.

However, a wireless connection to the electronic brake system of the trailer carries significant risks.

SUMMARY OF THE INVENTION

The present invention provides an electronic brake system for a trailer in which brake signals are transmitted wirelessly.

The electronic brake system comprises:

a brake controller in the trailer connected to a first communication device that is part of a first communication channel for receiving brake signals of a towing vehicle, wherein the first communication device is for wirelessly receiving brake signals of a brake system of the towing vehicle and for forwarding the brake signals to the brake controller, a second communication channel for receiving brake signals of the towing vehicle, wherein the brake controller converts the brake signals of the first communication channel into brake commands for the pneumatic brake installation only if brake signals arrive via the second communication channel in sync, that is to say at the same time or within a defined time window, and wherein the time window begins as soon as a brake signal arrives on one of the first and second communication channels.

The electronic brake system in the trailer therefore obtains brake signals via the first communication channel, which is configured for wireless transmission. In order to reduce the risk of "erroneous brake signals", a second communication channel is provided between the towing vehicle and the trailer. This is likewise used to transmit brake signals. The brake signals are converted into brake commands for the pneumatic brake installation only if brake signals also arrive via the second communication channel at the same time or within a defined time window.

In certain embodiments, the brake signals on the first communication channel also include details in regard to the intensity of the braking, while the brake signals on the second communication channel may have a relatively indiscriminate configuration. By way of example, a brake signal from which it is possible to deduce merely that braking actually needs to be effected is sufficient on the second communication channel.

The brake controller opens the cited time window, or the time window begins, as soon as a brake signal arrives on one of the communication channels, and then awaits the arrival of the brake signal on the other communication channel. If no brake signal arrives on the other communication channel, the brake controller provides no brake command to the pneumatic brake installation.

Globally, towing vehicles without an electronic brake system are also in use. To use the functions of a trailer with an electronic brake system, simple retrofitting of the towing vehicles with a controller, pressure sensors and a wireless communication device is possible, even without the towing vehicle itself being braked electronically. The pressure sensors are used to sense the pneumatic control pressure in the towing vehicle, the pneumatic control pressure then being transmitted from the controller via the wireless communication device to a wireless communication device in the trailer. In this embodiment, the trailer brakes more quickly than when the control pressure is delivered from the towing vehicle to the trailer purely pneumatically. An electronic brake system in the towing vehicle is therefore not a prerequisite for the present invention.

In specific embodiments, the time window may be up to 50 milliseconds (ms), alternatively up to 20 ms. The time window may be of such tight proportions because the brake signals on both communication channels come from the towing vehicle and are triggered by an operator, for example by operating a brake pedal.

In certain embodiments, the second communication channel contains an electrical line that is connected to the brake controller and the towing vehicle. In such embodiments, the brake signal of the communication channel may be transmitted via the electrical line to the brake controller. This can also involve a transmission of data via what is known as Powerline Communication (PLC).

In these or other embodiments, the second communication channel contains a brake light line that is connected to the brake controller such that voltage or current on the brake light line is perceivable by the brake controller as brake signals. The brake light line in the trailer is fed from a brake light line of the towing vehicle. When the brakes are operated, the brake lights in the trailer also light up. Accordingly, a current flows on the brake light line of the trailer, or a voltage is present. This is detected by the brake controller and rated as a brake signal of the second communication channel.

In these or other embodiments, the second communication channel contains a second communication device connected to the brake controller for wirelessly receiving brake signals. The trailer therefore obtains wireless brake signals on both communication channels. The first and second communication units may also be combined in one device. By way of example, WLAN transmitters/receivers may be configured to have a dual function, namely to have the capability of being both an access point and a client at the same time. If both trailer and towing vehicle have such a device with a dual function, two wireless communication channels can be opened up and used.

Further, in these or other embodiments, the second communication channel contains a sensor that is connected to the brake controller and that detects the lighting-up of a brake light of the trailer. This avoids scanning of the brake light line. Only a light-sensitive sensor directed at the brake light is necessary.

In specific embodiments, the brake controller converts a brake signal present on the first communication channel into a brake command for the pneumatic brake installation only for a limited period, for example for no more than one second. The restriction to the limited period increases security against a possible influence by a third party. After approximately one second, the brake pressure transmitted via the pneumatic control line is effective anyway.

The present invention also provides a brake controller for the electronic brake system described above. The electronic brake controller is provided with the requisite connections and matched software.

The present invention additionally provides a method for operating the electronic brake system in the trailer with a pneumatic brake installation. The method comprises: obtaining by the brake controller brake signals from the towing vehicle on the wireless first communication channel, and converting by the brake controller the brake signals of the first communication channel into brake commands for the pneumatic brake installation only if brake signals arrive via a second communication channel in sync, that is to say at the same time or within the defined time window.

In various embodiments, the defined time window for spotting synchronous brake signals on the two communication channels is 50 ms or less, alternatively 20 ms or less.

In certain embodiments, the brake controller converts the brake signals of the first communication channel into brake commands for the pneumatic brake installation only if a defined procedure for authorizing the wireless connection of the first communication channel has taken place. The authorization should have occurred after the ignition was last switched on in the towing vehicle. The switching-on of the ignition and the time of the procedure may be stored in the brake controller, so that collation is possible.

In certain embodiments, the authorization procedure comprises:

a controller of the towing vehicle sends a defined brake signal on a pneumatic control line and via the first communication channel, the brake signal on the pneumatic control line and the brake signal on the first communication channel are compared with one another, and if the brake signals are sufficiently similar, the wireless connection via the first communication channel is authorized and established.

The two brake signals can have slightly different timing, since the transmission of the pneumatic pressure takes longer than the wireless transfer of the brake signal. It is only important whether the two brake signals are sufficiently similar to one another, according to height and/or in their sequence, depending on the nature of the brake signals transferred by the controller of the towing vehicle. The controller of the towing vehicle is typically a brake controller.

The sufficient similarity of the brake signals is defined by appropriate criteria. In specific embodiments, the appropriate criteria of the sufficient similarity of the brake signals are a time characteristic of the brake signals and a brake pressure. The brake pressure transmitted on the pneumatic control line can be measured by a sensor. The first communication channel is used to deliver a numerical value for the brake pressure.

In certain embodiments, the second communication channel contains an electrical line that is connected to the brake controller and the towing vehicle, wherein signals on the electrical line are detected and are processed by the brake controller. These may also be signals that are transmitted via power line communication (widely used in North America).

In these or other embodiments, the second communication channel contains a brake light line that is connected to the brake controller, wherein voltage or current on the brake light line is detected and is processed by the brake controller. Voltage or current on the brake light line may act as a brake signal in the second communication channel.

In these or other embodiments, the second communication channel is a wireless communication channel via which signals are transmitted and are processed by the brake controller in the trailer.

In certain embodiments, the second communication channel may be configured to detect the lighting-up of brake lights of the trailer. An appropriate sensor close to a brake light detects the lighting-up and transmits a signal to the brake controller of the trailer.

In specific embodiments, the brake controller converts a brake signal transmitted via the first communication channel into a brake command for the pneumatic brake installation only for a limited period, for example for approximately one second or less.

The start of the authorization process and the transmission of the brake signals could be automatically triggered by one of the controllers before the vehicles depart. Alternatively, the authorization process can also be prompted by the first regular braking by a driver.

A successfully performed authorization can be indicated to the driver visually, audibly and/or in another way.

After successful authorization, the first communication channel can also be used for a data transmission outside the brake system, for example for the use of towing vehicle telematics reporting of trailer-specific data to an external receiver (e.g. to a fleet operator).

The present invention further provides a method for authorizing a wireless connection between a towing vehicle and a trailer, each with a pneumatic brake installation, electronic controller and communication device, said method comprising:

temporarily setting up the wireless connection, sending a brake signal via a controller of the towing vehicle with the wireless connection and sending a further brake signal to the trailer with a pneumatic control line, comparing the two brake signals with one another by a controller in the trailer, and if the brake signals are sufficiently similar, the wireless connection is authorized and persists, otherwise the wireless connection is dropped.

The method for authorizing the wireless connection is fundamentally independent of the method features presented above, but can advantageously be used in conjunction therewith. In particular, the method for authorizing the wireless connection can be utilized independent from the electronic braking system of the present invention.

The present invention also provides a vehicle combination comprising: a towing vehicle and a trailer, each with a pneumatic brake installation, communication device and electronic controller, a wireless first communication channel for communication between the two controllers, a second communication channel, and a brake controller as the controller in the trailer for performing the method.

BRIEF DESCRIPTION OF THE DRAWING

The invention is described in greater detail below with reference to the accompanying figures, in which.

DETAILED DESCRIPTION

Figure 1:
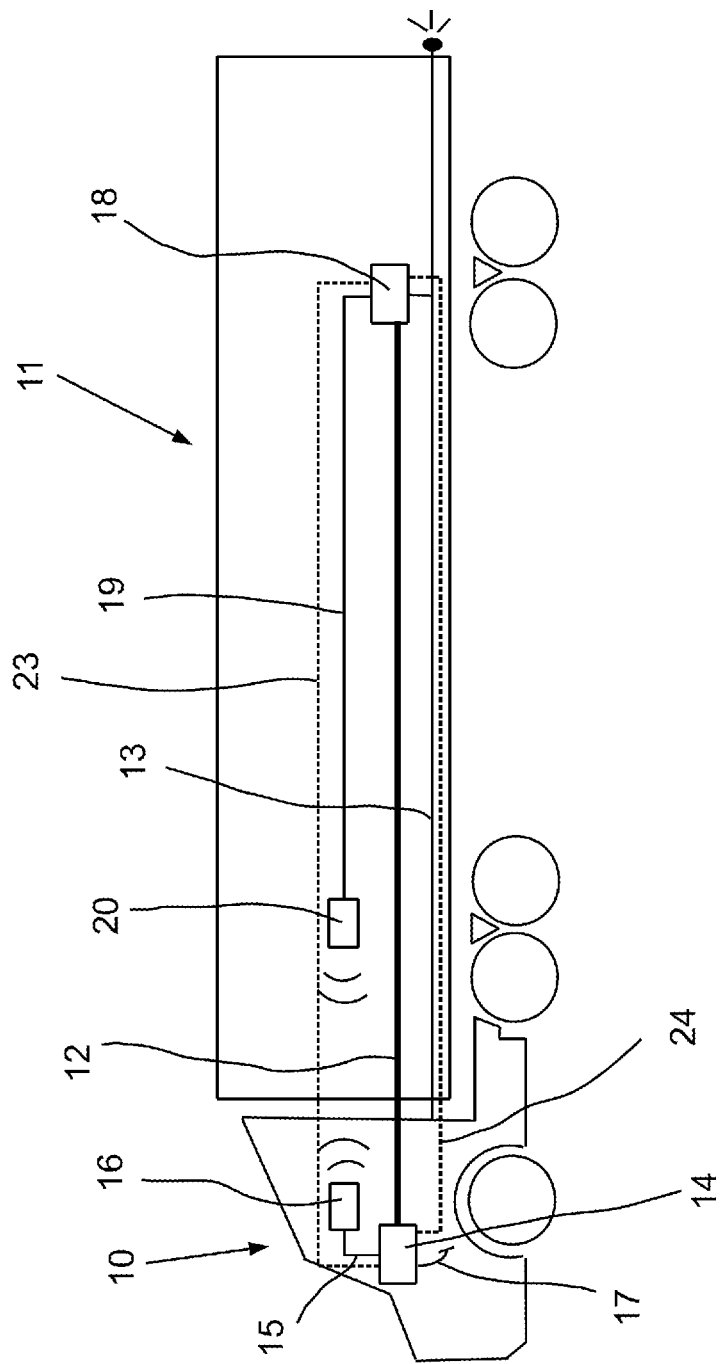
FIG. 1 shows a schematic depiction of a towing vehicle with a trailer.

With reference to the specific embodiment of the Figures, wherein like numerals generally indicate like parts throughout the several views, FIG. 1 shows intercoupled vehicles with a motor vehicle as a towing vehicle 10 and a semitrailer as a trailer 11, both with a pneumatic brake installation and an electronic brake system. Towing vehicle 10 and trailer 11 are connected to one another via a pneumatic control line 12 and an electrical brake light line 13, among other potential or further lines. Further lines, such as pneumatic supply pressure, electrical supply for the trailer, are not shown.

The electronic brake system and the pneumatic brake installation of the towing vehicle 10 are schematically combined in the brake system 14, which is connected via a line 15 to a communication device 16, namely in this case to a radio module in the towing vehicle 10. The brake system 14 is controlled by virtue of a brake pedal 17 being operated by an operator.

In the trailer 11, the pneumatic control line 12 has what is known as a trailer modulator connected to it, which has an electronic brake controller 18 integrated in it in a known manner. For simplification purposes, FIG. 1 shows only the brake controller 18. The latter has a communication device 20, namely in this case a radio module, which is arranged typically in the front third or close to a front of the trailer 11, connected to it via a line 19.

The two communication devices 16, 20 communicate with one another by WLAN. In this way, information and control commands can be interchanged between towing vehicle 10 and trailer 11. Specifically, the brake system 14 can deliver control commands to the brake controller 18 in the trailer 11 via the wireless connection of the communication devices 16, 20.

The electrical brake light line 13 is coupled to the brake controller 18, so that the latter can detect activity on the brake light line 13.

Figure 2:
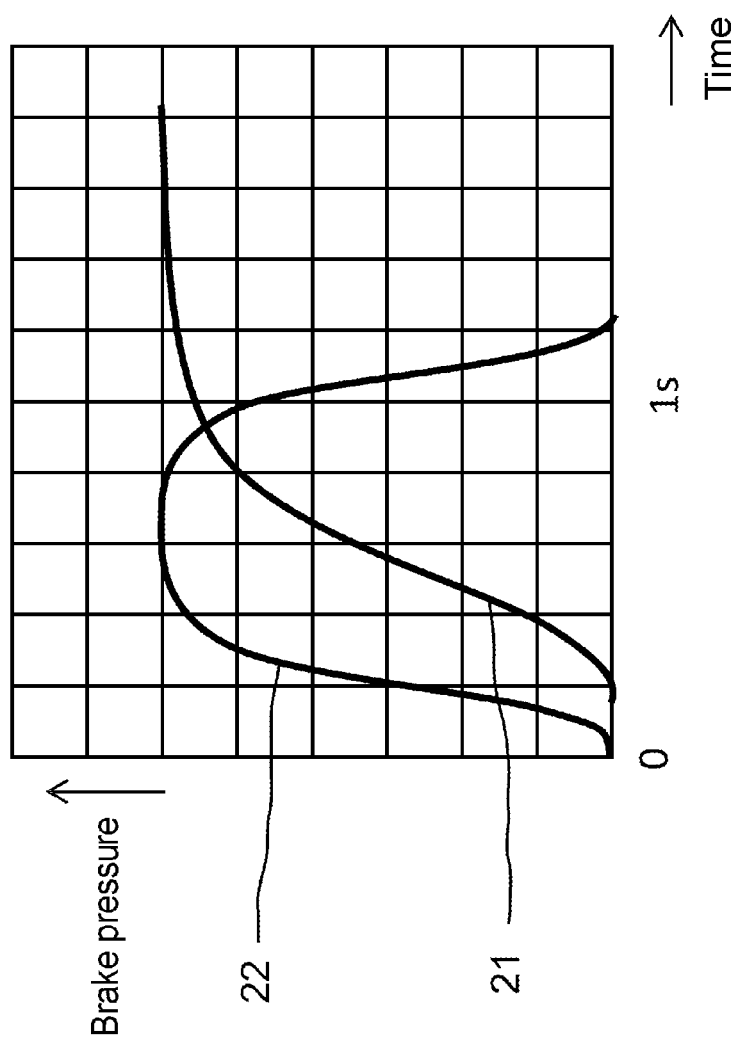
FIG. 2 shows a graph depicting brake pressure and time.

When the brake pedal 17 is operated, control pressure is supplied to the pneumatic brake system of the trailer 11 via the pneumatic control line 12. As can be seen from FIG. 2, this results in a brake pressure 21 in the trailer 11 with a delay. The full brake pressure is applied only after approximately one second. In this case, the trailer 11 is braked much later than the towing vehicle 10 and pushes the latter during the first second of the braking process.

To improve the braking response, operating the brake pedal 17 entails a brake signal being wirelessly transmitted to the trailer 11 via the communication devices 16, 20 and converted into a brake pressure 22 by the brake controller 18. The brake pressure 22 resulting on the basis of the wirelessly transmitted brake signal in the trailer 11 is likewise depicted in FIG. 2 and reaches the full brake pressure much more quickly.

In order to prevent or limit malfunctions, in particular as a result of the influence of third parties on the wireless communication, several safety functions are realized.

The brake controller 18 converts the brake signals transmitted wirelessly via the communication device 20 into corresponding brake pressures only for a short time, for example for approximately one second. Accordingly, the curve for the brake pressure 22 has a bell-shaped configuration in FIG. 2 with a sharply falling branch at approximately one second. Only the brake pressure 21 transmitted via the pneumatic control line 12 is now effective at that time.

The brake controller 18 scans the activity of the brake light line 13 continually and performs a collation with the brake signals arriving via the communication device 20. Only if brake signals on the line 19 and on the brake light line 13 arrive at the same time or within a defined time window does the brake controller 18 trigger braking with the brake pressure 22.

In various embodiments, the two communication devices 16, 20 have explicit device identifiers and connection parameters, as is customary with WLAN subscribers and other radio techniques. The communication device 20 in the trailer 11 is activated as soon as the trailer 11 is electrically connected to the towing vehicle 10 and the ignition or power supply is switched on in the towing vehicle 10. Subsequently, the communication device 20 performs an authorization for the procedure of wireless connection to the radio module 16.

The authorization procedure involves the output of a brake signal via the communication device 16, on the one hand, and via the control line 12, on the other hand, optionally after prior transfer of a request to the brake system 14 for the output of the brake signals. The request has the specification of a particular control pressure or brake pressure associated with it. The values of the transferred brake signals are compared with one another in the brake controller 18. If there is a sufficient match or similarity, the communication device 20 accepts the wireless connection to the communication device 16. The communication device 16 (with connection parameters) is stored by the communication device 20 as an authorized communication partner.

If the handbrake is active at the start of automatic authorization, the pneumatic control line 12 usually has a constant high pressure of above 6 bar present on it. In such embodiments, the authorization may then be aborted and moved to the first operation of the service brake to be operated by the driver during the journey. If the service brake is active, corresponding brake signals are sent on the control line 12, on the one hand, and via the communication device 16 and detected and compared in the trailer 11. These brake signals represent normally average pressures of between 1 and 4 bar and are not foreseeable in the specific individual case, which means that the authorization is provided with a higher level of security.

Whether the handbrake is engaged emerges in most cases from the high pressure. However, the service brake can also be used to produce a high pressure. An additional check to detect the handbrake is therefore advantageous. Typically, the brake light current or the brake light is scanned. Without an active brake light, it can be assumed that the handbrake has been operated. With an active brake light, the authorization can be continued.

Alternatively, there may be provision for the authorization to be performed on the basis of the first operation of the service brake by the driver, without prior request for a particular brake pressure or brake signal. In this case too, the operation of the brake light can be detected as an additional check.

The sufficient similarity of the brake signals is defined by appropriate criteria. In certain embodiments, the appropriate criteria are a time characteristic of the brake signals and a brake pressure. The brake pressure transmitted on the pneumatic control line 12 can be measured by a sensor integrated in the brake controller 18. The communication device 20 has a numerical value for the brake pressure delivered to it by the communication device 16.

Other communication partners are subsequently no longer permitted by the communication device 20, at least not until the next authorization procedure. In the event of the trailer being separated from the electrical supply of the towing vehicle or in the event of the ignition being switched off in the towing vehicle, the authorization expires.

For control engineering purposes, the wireless connection between the communication devices 16, 20 is understood in this case to mean a first communication channel 23, for the brake light line 13, as a physical connection, is part of a second communication channel 24. The second communication channel 24 can also be realized in a different way, for example by another electrical line. A wireless second communication channel is also possible, and this is realizable by dual functions of the radio modules as communication devices 16, 20, for example. The use of WLAN radio modules that may be active as an access point and as a client in a WLAN at the same time is known. In this way, it is possible to set up and use two separate WLAN connections as two separate communication channels.

The communication channels 23, 24 shown in FIG. 1 are only supposed to make it clear that two paths for the transmission of information between the brake system of the towing vehicle 10 and the brake system of the trailer are formed and both lead to the brake controller 18. As depicted, the communication channels 23, 24 run along the wireless transmission between the two communication devices 16, 20, on the one hand, and along the brake light line 13, on the other hand. In particular the second communication channel 24 may also be realized in a different way than depicted in FIG. 1.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. An electronic brake system for a trailer with a pneumatic brake installation, said electronic brake system comprising:
   a brake controller in the trailer connected to a first communication device that is part of a first communication channel for receiving brake signals of a towing vehicle, wherein the first communication device is for wirelessly receiving brake signals of a brake system of the towing vehicle and for forwarding the brake signals to the brake controller,
   a second communication channel for receiving brake signals of the towing vehicle,
   wherein the brake controller converts the brake signals of the first communication channel into brake commands for the pneumatic brake installation only if brake signals arrive via the second communication channel at the same time or within a defined time window, wherein the time window begins as soon as a brake signal arrives on one of the first and second communication channels.

2. The brake system as claimed in claim 1, wherein the time window is up to 50 ms.

3. The brake system as claimed in claim 1, wherein the second communication channel contains an electrical line that is connected to the brake controller and the towing vehicle.

4. The brake system as claimed in claim 1, wherein the second communication channel contains a brake light line that is connected to the brake controller such that voltage or current on the brake light line is perceivable by the brake controller as brake signals.

5. The brake system as claimed in claim 1, wherein the second communication channel contains a communication device connected to the brake controller for wirelessly receiving brake signals.

6. The brake system as claimed in claim 1, wherein the second communication channel contains a sensor that is connected to the brake controller and that detects the lighting-up of a brake light of the trailer.

7. The brake system as claimed in claim 1, wherein the brake controller converts a brake signal present on the first communication channel into a brake command for the pneumatic brake installation only for a limited period.

8. A brake controller for an electronic brake system as claimed in claim 1.

9. A method for operating an electronic brake system as claimed in claim 1, said method comprising:
   obtaining by the brake controller brake signals from the towing vehicle on the first communication channel, and
   converting by the brake controller the brake signals of the first communication channel into brake commands for the pneumatic brake installation only if brake signals arrive via the second communication channel at the same time or within defined time window.

10. The method as claimed in claim 9, wherein the time window is up to 50 ms.

11. The method as claimed in claim 9, wherein the brake controller converts the brake signals of the first communication channel into brake commands for the pneumatic brake installation only if a defined procedure for authorizing a wireless connection of the first communication channel has taken place.

12. The method as claimed in claim 11, wherein the defined procedure comprises:
   sending by a controller of the towing vehicle a defined brake signal on a pneumatic control line and via the first communication channel,
   comparing the brake signal on the pneumatic control line and the brake signal on the first communication channel with one another, and
   authorizing and establishing the wireless connection of the first communication channel if the brake signals are sufficiently similar.

13. The method as claimed in claim 9, wherein the second communication channel contains an electrical line that is connected to the brake controller and the towing vehicle, and wherein signals on the electrical line are detected and are processed by the brake controller.

14. The method as claimed in claim 9, wherein the second communication channel contains a brake light line that is connected to the brake controller, and wherein voltage or current on the brake light line is detected and processed by the brake controller.

15. The method as claimed in claim 9, wherein the second communication channel is a wireless communication channel via which signals are transmitted and are processed by the brake controller.

16. The method as claimed in claim 9, wherein the second communication channel is configured to detect lighting-up of brake lights of the trailer.

17. The method as claimed in claim 9, wherein the brake controller converts a brake signal transmitted via the first communication channel into a brake command for the pneumatic brake installation only for a limited period.

18. A vehicle combination comprising:
   a towing vehicle and a trailer, each with a pneumatic brake installation, communication device and electronic controller,
   a wireless first communication channel for communication between the electronic controllers,
   a second communication channel and
   a brake controller as the electric controller in the trailer for performing the method as claimed in claim 9.

19. A method for authorizing a wireless connection between a towing vehicle and a trailer, said method comprising:
   providing each of the towing vehicle and the trailer with a pneumatic brake installation, an electronic controller and a communication device,
   temporarily setting up the wireless connection between the communication device of the towing vehicle and the communication device of the trailer,
   sending with the wireless connection via the electronic controller of the towing vehicle a first brake signal and sending a second brake signal to the trailer via a pneumatic control line,
   comparing the first and second brake signals with one another by the controller in the trailer, and
   authorizing and maintaining the wireless connection if the brake signals are sufficiently similar, wherein maintaining the wireless connection includes storing a connection parameter of the wireless connection to at least one of the electronic controller of the towing vehicle and the electronic controller of the trailer.

* * * * *